(12) United States Patent
Hehn et al.

(10) Patent No.: US 7,989,052 B2
(45) Date of Patent: *Aug. 2, 2011

(54) AIRBAG COVER

(75) Inventors: Wilhelm Hehn, Aham (DE); Georg Sigl, Arnstorf (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 59 days.

This patent is subject to a terminal disclaimer.

(21) Appl. No.: 11/088,727

(22) Filed: Mar. 25, 2005

(65) Prior Publication Data

US 2005/0215143 A1 Sep. 29, 2005

(30) Foreign Application Priority Data

Mar. 26, 2004 (DE) .......................... 10 2004 014 942

(51) Int. Cl.
*B65D 65/28* (2006.01)
*B60R 21/16* (2006.01)
*B60R 21/20* (2011.01)
*B60R 21/215* (2011.01)

(52) U.S. Cl. ....... 428/190; 428/43; 428/189; 280/728.1; 280/728.3

(58) Field of Classification Search ................... 442/1, 2, 442/32; 280/728.1–743.2, 728.3; 428/43, 428/189, 190
See application file for complete search history.

(56) References Cited

U.S. PATENT DOCUMENTS

| | | | |
|---|---|---|---|
| 5,082,310 A * | 1/1992 | Bauer ............................ | 280/732 |
| 5,110,647 A * | 5/1992 | Sawada et al. ................. | 428/43 |
| 5,407,225 A * | 4/1995 | Cooper ....................... | 280/728.3 |
| 5,533,748 A * | 7/1996 | Wirt et al. .................. | 280/728.3 |
| 5,611,564 A | 3/1997 | Bauer | |

(Continued)

FOREIGN PATENT DOCUMENTS

DE 196 54 246 A1 12/1996

(Continued)

*Primary Examiner* — D. Lawrence Tarazano
*Assistant Examiner* — Matthew D Matzek
(74) *Attorney, Agent, or Firm* — Sughrue Mion, PLLC

(57) ABSTRACT

The present invention relates to an airbag cover, in particular for a motor vehicle, comprising a decor layer (1) having a decor side (2) forming an observation area, which borders the space in which the airbag deploys if the need arises, and an airbag side (3) opposite to the decor side. The decor layer further has a weakening (4) in the region of a tear line for deploying the airbag, which extends from the airbag side of the decor layer such that the decor layer is substantially intact on the decor side. The air bag cover of the present invention further has at least one second layer (2) which may be designed as spacer mesh, the second layer being attached to the airbag side of the decor layer (1) and which also has a weakening region (7) along the tear line. In order that the weakening in the decor layer (1) remains permanently invisible from the decor side (2), an intermediate layer (5) is further provided in the airbag cover of the invention which is arranged between the decor layer and the second layer. The intermediate layer is substantially intact in the region of the tear line and connected to the decor layer so that it can take up or compensate forces in the plane or parallel to the plane of the decor layer at least in the region of the weakening of the decor layer. Contrary thereto, the intermediate layer is designed such that it easily tears open substantially perpendicular to this plane under the influence of force.

8 Claims, 1 Drawing Sheet

U.S. PATENT DOCUMENTS

| | | |
|---|---|---|
| 5,639,115 A | 6/1997 | Kelley et al. |
| 5,979,931 A | 11/1999 | Totani et al. |
| 5,997,030 A * | 12/1999 | Hannert et al. ............ 280/728.3 |
| 6,294,124 B1 | 9/2001 | Bauer et al. |
| 2002/0042235 A1 * | 4/2002 | Ueno et al. ................... 442/227 |
| 2003/0066586 A1 | 4/2003 | Blockhaus et al. |
| 2003/0124295 A1 | 7/2003 | Gundlach et al. |
| 2004/0164531 A1 * | 8/2004 | Riha et al. .................... 280/732 |
| 2004/0195814 A1 * | 10/2004 | Muller et al. ............. 280/743.1 |

FOREIGN PATENT DOCUMENTS

| | | |
|---|---|---|
| DE | 19738493 A1 | 3/1998 |
| DE | 199 12 107 A1 | 3/1999 |
| DE | 203 12 146 U1 | 12/2003 |
| DE | 102 40 439 A1 | 3/2004 |
| DE | 102 41 715 A1 | 3/2004 |
| EP | 0 916 555 A2 | 5/1999 |
| EP | 1380477 A1 * | 1/2004 |
| WO | WO 97/03866 | 2/1997 |

* cited by examiner

AIRBAG COVER

FIELD OF THE INVENTION

The present invention relates to an airbag cover, in particular for a motor vehicle. Its use is however conceivable for vehicles of another type which are used on land, water and in the air. An air bag cover of the present invention serves as a cover of a folded air bag which is integrated, for example, into a dashboard or a steering wheel of a vehicle.

PRIOR ART

According to present prior art, the tear lines for the upper parts of dashboards having decors laminated thereon, such as e.g. leather or artificial leather, which allow opening the air bag flap when the airbag is triggered, are mostly realized by means of sewn tear lines.

However, in order to improve the haptic and optic characteristics of dashboards, efforts were already made in prior art solutions to do without these visible tear seams. Various efforts were therefore undertaken to weaken the decor layers in a targeted manner such that this weakening is not visible on the finished part from the outside. Thus, DE 102 31 131 A1 proposes an airbag cover having a decor layer attached or laminated to a spacer mesh. Further, weakenings are provided both in the spacer mesh and in the decor layer. In order that these weakenings are not, however, visible from a decor side forming an observation area, the weakening is introduced into one side of the decor layer which is arranged opposite the decor side.

It is thus possible that due to the design of the weakening and the structure of the entire airbag cover it can be realized that the weakenings are not visible from the outside when the finished part is new. Tests have, however, shown that over the course of time the weakened tear line becomes clearly visible on the surface of these parts after corresponding long-term performance, such as exposure to varying climate conditions.

DESCRIPTION OF THE INVENTION

The present invention is thus based on the technical problem of providing an airbag cover which does not have a visible seam or weakening, the weakening remaining invisible even under the influence of temperature and moisture and long-term ageing as well as long-term performance, and the functionality of the airbag, i.e. the bursting of the airbag cover as a result of airbag release or inflation, is maintained.

The invention is based on the concept that with of long-term performance, such as e.g. long-term exposure to varying climate conditions), the decor layer, i.e., its material structure and layer structure/the laminate combined with a second layer or a spacer mesh, is exposed to strong tensile load. This tensile load results in that the weakening introduced into the decor layer, which is initially not visible on the decor side, i.e., the observation side, becomes again visible. Consequently, the basic idea of the present invention consists in counteracting these tensile stresses in the decor layer.

To this end, the present invention proposes an airbag cover, in particular for a motor vehicle, which has a decor layer. The decor layer in turn has a decor side which in the motor vehicle example faces the passenger compartment into which the airbag unfolds if the need arises. The decor side of the decor layer forms an observation area which is perceived by a passenger visually and haptically. In addition, the decor layer has an airbag side which is opposite the decor side. When mounted, the airbag side of the decor layer is not visible from the passenger compartment. The decor layer may be made e.g. of leather. However, canvas, artificial leather, textiles, thermoplastic or thermosetting synthetic materials or combinations thereof are also conceivable. In addition, the decor layer has a weakening in the area of a tear line for unfolding the airbag. This weakening is introduced from the airbag side of the decor layer and extends such that the decor side of the decor layer remains substantially intact. Further, the airbag cover of the present invention has at least one second layer which is arranged on the airbag side of the first layer and has a weakened region along the tear line. The second layer, which may be a spacer mesh, is e.g. made of textiles, a foil or of non-woven material. The textiles or the non-woven material of this layer can further be made of thermoplastic or thermosetting synthetic materials or of metals, ceramics, glass or natural materials. In order to counteract the tensile forces occurring in the decor layer, the airbag cover of the present invention further comprises an intermediate layer. This intermediate layer is arranged between the decor layer and the second layer. The intermediate layer is substantially intact in the area of the tear line. In addition, the intermediate layer has physical properties which entail that the intermediate layer is resistant against forces in its plane or parallel to its plane (i.e. tensile forces) while it has a relatively low tear resistance to forces acting perpendicularly to this plane. The intermediate layer is connected to the decor layer and, therefore, forces in the plane or parallel to the plane of the decor layer can be taken up or absorbed by the physical properties of the intermediate layer at least in the area of the weakening of the decor layer. In order that the intermediate layer does not negatively influence a tearing-up of the air bag cover when it is released or inflated, this cover has a low tear resistance to forces perpendicular to its plane. The present invention is thus particularly characterized by the introduction of an intermediate layer which is relatively resistant in the tensile direction of the decor layer without a targeted weakening in the area of the tear line between the weakened decor and the also weakened second layer for the uptake of tensile forces in the area of the tear line weakening which are generated during long-term exposure to varying climate conditions.

Advantageously, the intermediate layer can e.g. be made of textile, cardboard or special paper, etc. and has a relatively low tear resistance perpendicular to the resulting tensile forces and, thus, in the opening direction of the airbag flap, while it is resistant in the tensile direction of the tensile forces.

Advantageously, the intermediate layer can bridge the weakening of the decor layer in a direction perpendicular to the weakening, parallel to the plane of the decor layer. In other words, the intermediate layer has the ability to bridge the weakening or the weakening region of the tear line in the tensile direction of the decor layer such that the weakening will not become visible on the decor side of the decor layer and the opening behaviour of the tear line is not thereby inadmissibly negatively affected, i.e., the opening of the airbag cover can be executed smoothly. In other words, the intermediate layer holds together by a kind of a bridge the weakening due to the pulling apart by the tensile forces in the decor layer.

Advantageously, the intermediate layer is bonded to the decor layer and the composite of decor layer and intermediate layer is laminated with the second layer. It is, however, also conceivable to apply the second layer in a bonding procedure.

Advantageously, the weakening in the decor layer is a cut made from the side of the air bag which does not, however, extend to the decor side and therefore is not visible on the decor side. The cut is carried out perpendicularly or substantially perpendicularly to the plane formed by the decor layer.

Alternatively, the weakening can also be produced by a laser beam or by milling a tear line.

Further, a carrier layer is advantageously provided which carries the decor layer, the second layer and the intermediate layer. This carrier layer can, for example, be the dashboard which can be provided with an airbag sheet and an airbag milling. The carrier layer serves as reinforcement layer for the airbag cover.

BRIEF DESCRIPTION OF THE DRAWINGS

The invention is exemplified below by means of the accompanying figure in which.

DESCRIPTION OF ONE EMBODIMENT OF THE INVENTION

Figure 1:
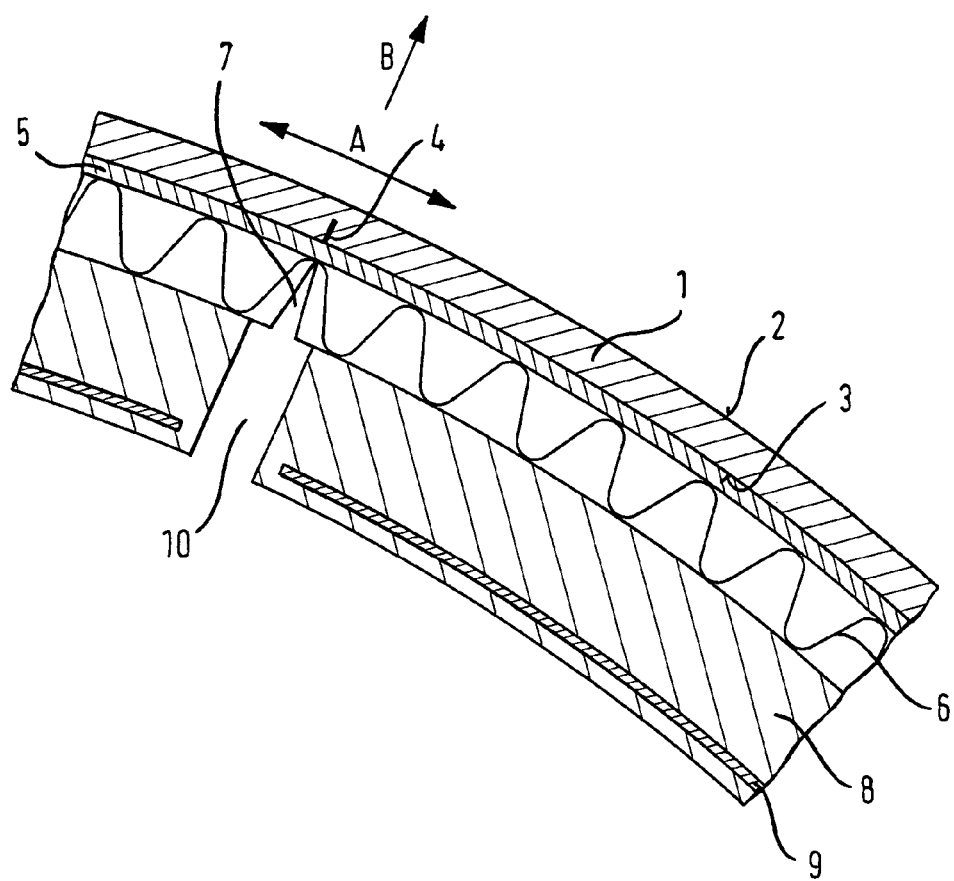
FIG. 1: shows a cross-sectional view of an airbag cover according to the present invention.

FIG. 1 shows a cross-section of an embodiment example according to the invention. The airbag cover represented in FIG. 1 shows a decor layer 1 which has a decor side 2 and an airbag side 3. The decor side 2 forms an observation area which is turned, in the motor vehicle example, towards the vehicle interior, i.e., the passenger compartment. The observation area is subjected to particularly severe requirements, in particular regarding haptic and optic characteristics or appearance. The requirements regarding the observation areas are extremely high in particular for vehicles of the present prior art in the mid and upper ranges.

The decor layer 1 of the present airbag cover further has a weakening 4 in the region of the airbag tear line. The weakening 4 of the present embodiment example is a cut in the decor layer 1. This cut is made on the airbag side 3 of the decor layer and substantially extends perpendicularly to the plane of the decor layer 1 in the direction of the decor side 2. In other words, the depth direction of the weakening or the cut 4 is aligned such that it extends vertically to the plane of the decor layer 1. Further, the cutting depth is selected such that the decor side 2 of the decor layer 1 and, thus, the observation area remains intact when viewed from the passenger compartment.

In addition, an intermediate layer 5 is provided in the represented embodiment of the present invention. The intermediate layer 5 is therein preferably bonded to the decor layer 1. The intermediate layer 5 has substantially no weakenings in the region of the cut 5 and remains intact in this region. The intermediate layer 5 is further designed such that it is resistant in the direction of tensile forces A of the decor layer 1 while it has a low tear resistance in a direction B perpendicular to the directions of the tensile forces A. The intermediate layer 5 thereby bridges the weakening 4 of the decor layer 1 and is connected with the decor layer 1 on both sides of the weakening 4, i.e., the left side of the weakening 4 (left/right refer to the representation in FIG. 1).

A spacer mesh 6 is laminated onto the composite of decor layer 1 and intermediate layer 5 which were bonded in the embodiment shown. The spacer mesh 6 has a weakened region 7 in the area of the weakening 4 of the decor layer 1. The weakened region 7 and the weakening 4 are aligned towards each other so that combined they form the tear line when the airbag is deployed. In the production process, this is obtained by correspondingly positioning the respective blanks and marking these blanks outside of the areas of use of these blanks.

Further, the combination of decor layer 1, intermediate layer 5 and spacer mesh 6 is arranged on a carrier 8.

Alternatively, the spacer mesh 6 may first be applied to the carrier and the composite of decor layer 1 and intermediate layer 5 subsequently attached thereto. The sequence in which the layers are attached to each other may be arbitrary and the present invention is not fixed to any special sequence. Rather, the skilled person will know various possibilities. The carrier shown in the present embodiment is the dashboard of a motor vehicle. This dashboard is provided with an airbag sheet 9 serving to reinforce the airbag cover. Further, an airbag milling 10 is provided in the dashboard 8 which corresponds to the tear line of the airbag cover.

The spacer mesh 6 may be both cut or perforated and it may be composed of textiles, a foil or of non-woven material. Further, the decor layer 1 may be made of leather, canvas, synthetic material, textiles or combinations thereof. A separate carrier may also be provided instead of the dashboard.

If tensile forces are generated under certain weather conditions in the plane of the decor layer or parallel thereto, as illustrated by the arrows, the weakening 4 would change in the long-term test such that it would become visible from the decor side 2 of the decor layer 1. However, according to the present invention, these tensile forces A are taken up or absorbed by the intermediate layer 5 which is resistant in the tear direction and connected to the decor layer 1 so as to bridge the cut 4. Consequently, the tensile forces A do not have such an effect on the decor layer 1 that the weakening 4 becomes visible on the decor side 2. In other words, the intermediate layer prevents a tearing-apart of the decor layer 1 in the area of the weakening 4 under tensile forces and the corresponding appearance of the weakening 4 on the decor side 2.

If, contrary thereto, the airbag is the triggered such that a force is exerted in the direction B on the airbag cover and the decor layer 1 tears open along the weakening region of the weakening 4 and the spacer mesh 6, the intermediate layer 5, which has a low tear resistance with respect to the forces B, is also cut through such that the airbag cover can clear the way for the unfolding of the airbag. Consequently, the intermediate layer 5 serves an uptake of tensile forces A in the decor layer 1 or their compensation without impeding the tearing open of the airbag cover 1 when unfolding the airbag. This solution ensures that the haptic and optic characteristics of the airbag cover and the decor side 2 of the airbag cover remain permanently intact, i.e., that a weakening 4 in the decor layer 1 is invisible from the decor side 2, without impeding the tearing open of the airbag cover when the airbag is unfolded.

The present invention was described using an exemplary embodiment. It is however obvious that various changes and modifications may be performed without departing from the basic idea of the present invention as is defined by the accompanying claims.

The invention claimed is:

1. An airbag cover, comprising:
   a decor layer having a decor side forming an observation area, which borders the space in which the airbag is deployed, and an airbag side opposite the decor side, the decor layer having a weakening in the region of a tear line for unfolding the airbag, which extends from the airbag side of the decor layer such that the decor layer on the decor side is substantially intact;
   at least one second layer arranged on the airbag side of the decor layer and having a weakened region along the tear line;
   an intermediate layer arranged between the decor layer and the second layer, which is substantially intact in the region of the weakening of the decor layer and the weakened region of the second layer, and
which has substantially no weakening in the region of the tear line, and
a carrier layer which carries the decor layer, the second layer and the intermediate layer,
wherein the carrier layer is adapted to reinforce the airbag cover,
wherein the intermediate layer consists essentially of a textile, a cardboard, or a paper,
wherein the intermediate layer is configured to take up forces in the plane or parallel to the plane of the decor layer,
wherein the intermediate layer is in contact with and connected to the decor layer bridging the weakening of the decor layer in a direction perpendicular to the weakening, parallel to the plane of the decor layer, such that the intermediate layer is resistant to tensile forces in the decor layer at least in the region of the weakening of the decor layer, and the intermediate layer tearing under a force substantially perpendicular to the plane of the decor layer, and
wherein the intermediate layer holds together the weakening of the decor layer against tensile forces in the decor layer.

2. The airbag cover according to claim 1, wherein the second layer is a spacer mesh.

3. The airbag cover according to claim 1, wherein the intermediate layer is bonded to the decor layer and the composite of decor layer and intermediate layer is laminated with the second layer.

4. The airbag cover according to claim 1, wherein the weakening in the decor layer is a cut made from the airbag side.

5. An airbag cover according to claim 1, incorporated into a motor vehicle.

6. An airbag cover according to claim 1, wherein a side of the intermediate layer that is connected to the decor layer has no weakening at any location in contact with the decor layer, and
wherein a side of the intermediate layer that is connected to the second layer has no weakening at any location of the second layer.

7. The airbag cover according to claim 1, wherein the carrier layer has an airbag weakening along the weakened region of the second layer.

8. An airbag cover, comprising:
a decor layer having a decor side forming an observation area, which borders the space in which the airbag is deployed, and an airbag side opposite the decor side, the decor layer having a weakening in the region of a tear line for unfolding the airbag, which extends from the airbag side of the decor layer such that the decor layer on the decor side is substantially intact;
at least one second layer arranged on the airbag side of the decor layer and having a weakened region along the tear line;
an intermediate layer arranged in contact with the decor layer and between the decor layer and the second layer, which is substantially intact in the region of the weakening of the decor layer and the weakened region of the second layer, and
which has substantially no weakening in the region of the tear line, and
a carrier layer which carries the decor layer, the second layer and the intermediate layer,
wherein the carrier layer comprises an airbag weakening along the weakened region of the second layer and is adapted to reinforce the airbag cover, and
wherein the intermediate layer consists essentially of a textile, a cardboard, or a paper.

* * * * *